United States Patent [19]

Pigeon

[11] Patent Number: 4,486,281

[45] Date of Patent: Dec. 4, 1984

[54] PHOTOCURING OF ORGANOPOLYSILOXANES DEVOID OF SI-H BONDS AND CONTAINING NO SITES OF ACTIVATED ETHYLENIC UNSATURATION

[75] Inventor: Raymond Pigeon, Francheville, France

[73] Assignee: Rhone-Poulenc Specialites Chimiques, Courbevoie, France

[21] Appl. No.: 501,912

[22] Filed: Jun. 7, 1983

Related U.S. Application Data

[63] Continuation-in-part of Ser. No. 447,482, Dec. 7, 1982, abandoned.

[30] Foreign Application Priority Data

Dec. 9, 1981 [FR] France ............................... 81 23134

[51] Int. Cl.³ .......................... C08F 2/46; C08F 30/08
[52] U.S. Cl. ................................. 204/159.13; 428/447
[58] Field of Search ..................... 204/159.13; 528/38; 428/447

[56] References Cited

U.S. PATENT DOCUMENTS

| | | | |
|---|---|---|---|
| 3,627,836 | 12/1971 | Getson | 204/159.13 |
| 4,064,027 | 12/1977 | Gant | 204/159.13 |
| 4,075,167 | 2/1978 | Takamizawa | 528/38 |
| 4,191,713 | 3/1980 | Yonezawa | 528/38 |

FOREIGN PATENT DOCUMENTS

| | | | |
|---|---|---|---|
| 3006167 | 9/1980 | Fed. Rep. of Germany | 204/159.13 |
| 1526934 | 5/1968 | France | 204/159.13 |

*Primary Examiner*—Theodore Morris
*Attorney, Agent, or Firm*—Burns, Doane, Swecker & Mathis

[57] ABSTRACT

An organopolysiloxane composition is facilely photocured, e.g., into a variety of non-stick coatings, by subjecting to a photocross-linking amount of ultraviolet irradiation, admixture of (i) a polysiloxane comprised of hydroxysilyl groups devoid of Si-H bonds and containing no organic radicals which include sites of activated ethylenic unsaturation, and (ii) an aminopolyalkoxysilane.

18 Claims, No Drawings

PHOTOCURING OF ORGANOPOLYSILOXANES DEVOID OF SI-H BONDS AND CONTAINING NO SITES OF ACTIVATED ETHYLENIC UNSATURATION

CROSS-REFERENCE TO RELATED APPLICATIONS

This application is a continuation-in-part of U.S. patent application Ser. No. 447,482, filed Dec. 7, 1982, now abandoned.

BACKGROUND OF THE INVENTION

1. Field of the Invention

The present invention relates to a process for cross-linking liquid organopolysiloxane compositions obtained from (i) a polysiloxane comprising hydroxysilyl groups containing no Si-H bonds and no organic radicals which include sites of activated ethylenic unsaturation, and from (ii) an aminopolyalkoxysilane. More especially according to the invention, the cross-linking process is carried out by simply exposing the compositions to ultraviolet radiation. Depending upon the choice of the various constituents of the composition, the subject process enables obtainment, in particular, of good non-stick coatings on various cellulosic materials, and also protective coatings, which can be used, for example, for coating printed circuits.

2. Description of the Prior Art

Numerous processes are well known to this art for hardening or curing organopolysiloxane compositions obtained from a polysiloxane comprising hydroxysilyl groups and from an aminopolyalkoxysilane and/or a polyalkoxysilane.

Such processes can be carried out by employing catalysts which ensure rapid cross-linking on exposure to moisture, if appropriate after heating to moderate temperatures; the catalysts are typically selected from among amines, organo-tin compounds, alkyl titanates, titanium chelates or carboxylates, and the like.

The subject compositions can also be cross-linked by exposing a thin layer of the latter to various radiations. In particular, it is known that it is possible to photocross-link certain organopolysiloxane compositions obtained from an organopolysiloxane comprising hydroxysilyl groups and from an aminoalkoxysilane bearing activated unsaturated groups (acroyloxy, methacroyloxy or the like). The activated groups are those which undergo polyaddition under the effects of ultraviolet radiation; alkenyl or cycloalkenyl radicals, such as vinyl, allyl or cyclohexenyl groups, do not photopolymerize and obviously are not therefore considered as radicals including sites of "activated ethylenic unsaturation". Photocross-linkable compositions such as described above are disclosed, for example, in Japanese patent Nos. J5 4038-393 and J5 4063-200.

It too is known that UV radiation can be used to cross-link organopolysiloxane compositions containing no hydroxysilyl groups, but containing activated unsaturated groups [compare, inter alia, French patent No. 2,295,959]or, alternatively, having Si-alkenyl groups and Si-H groups (French patent No. 2,245,729).

By virtue of its manifest simplicity, the photocross-linking technique is particularly valuable in industry. However, this method, which makes it possible to easily provide, for example, a very thin non-stick coating onto a sheet of paper, or alternatively a protective coating onto printed circuits, is nevertheless restricted at the present time to the use of but certain organopolysiloxane compositions such as defined above, containing organic groups including sites of ethylenic unsaturation, generally activated sites of ethylenic unsaturation, and, if appropriate, Si-H bonds and/or hydroxysilyl groups.

Therefore, serious need exists in the photocross-linking art for yet additional genera of organopolysiloxane compositions obtained from a polysiloxane comprising hydroxysilyl groups which are also adapted for facile photocross-linking/curing.

SUMMARY OF THE INVENTION

Accordingly, a major object of the present invention is the provision for the photocross-linking/photocuring of particular class of organopolysiloxane compositions, which organopolysiloxane compositions comprising intimate admixture of a polysiloxane comprising hydroxysilyl groups containing no Si-bonds and no organic radicals including sites of activated ethylenic unsaturation, together with a compound containing an aminopolyalkoxysilyl group, and the photocross-linking/photocuring of the subject organopolysiloxane compositions being carried out by exposing thin layers thereof to ultraviolet radiation.

DETAILED DESCRIPTION OF THE INVENTION

More particularly according to this invention, it has now unexpectedly and surprisingly been found that those organopolysiloxane compositions devoid of Si-H bonds, as well as also being devoid of organic groups containing sites of activated ethylenic unsaturation, are also well adapted for facile curing/hardening/cross-linking by means of ultraviolet irradiation.

Any polysiloxane which is known or can be prepared by any known process, and which contains no Si-H bonds and no organic radicals comprising activated ethylenic unsaturation, can be used within the scope of the present invention. The polysiloxanes can be, for example, $\alpha,\omega$-dihydroxypolydiorganopoly-siloxanes consisting of units of the formula $(Z_2SiO)$, in which the symbols Z, which are identical or different, represent:

(1) saturated aliphatic or cycloaliphatic hydrocarbon radicals having from 1 to 6 carbon atoms and optionally containing from 1 to 6 chlorine and/or fluorine atom substituents, (2) alkenyl radicals having from 2 to 4 carbon atoms and representing at most 5% by number of all of the hydrocarbon radicals borne by the organopolysiloxane, or (3) phenyl, alkylphenyl or phenylalkyl radicals having from 6 to 8 carbon atoms and optionally substituted by one to 4 chlorine and/or fluorine atom substituents.

By way of illustration, the following groups are exemplary of the radicals Z: methyl; ethyl; propyl; isopropyl; butyl; isobutyl; $\alpha$-pentyl, t-butyl; chloromethyl; dichloromethyl; $\alpha$-chloroethyl; $\alpha,\beta$-dichloroethyl; fluoromethyl; difluoromethyl; $\alpha,\beta$-difluoroethyl; 3,3,3-trifluoropropyl; trifluorocyclopropyl; 4,4,4-trifluorobutyl; 3,3,3,4,4,5,5-heptafluoropentyl; vinyl; allyl; phenyl; p-chlorophenyl; m-chlorophenyl; 3,5-dichlorophenyl; trichlorophenyl; tetrachlorophenyl; o-, p- or m-tolyl; $\alpha,\alpha,\alpha$-trifluorotolyl; and xylyl, such as 2,3-dimethylphenyl and 3,4-dimethylphenyl.

Preferably, the organic radicals Z are methyl, phenyl or vinyl radicals, it being possible for these radicals to be optionally chlorinated and/or fluorinated.

Within the ambit of the present invention, a mixture consisting of one or more linear organopolysiloxanes, to which other branched or cross-linked organopolysiloxanes are added, can also be used as the polysiloxane comprising hydroxysilyl groups. In this category, it is possible to use organopolysiloxane resins consisting of $ZSiO_3$, $SiO_2$, $((Z)_2SiO)$ and $(Z)_2(OH)SiO_{0.5}$ units in any proportions with Z being as above-defined.

Also consistent herewith, any known compound can be used as the compound comprising aminopolyalkoxysilyl groups. Thus, this compound can be an aminopolyalkoxysilane or an aminopolyalkoxypolysiloxane.

The aminopolyalkoxysilanes are represented by the general formula:

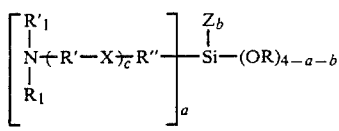
(I)

The aminopolyalkoxypolysiloxanes are represented by the recurring units having the formula:

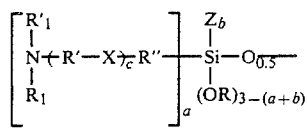
(II)

In these formulae, the various symbols represent, respectively:

(i) a: an integer equal to 1 or 2; (ii) b: an integer equal to 0 or 1, the sum (a+b) being equal to at most 2; (iii) c: an integer equal to 0 or 1; (iv) X: an oxygen atom or a group

with $R_2$ being as defined below; (v) $R_1$ and $R'_1$, identical or different, represent a hydrogen atom or an alkyl group having from 1 to 4 carbon atoms; (vi) R' and R": divalent alkylene radicals having from 1 to 6 carbon atoms; (vii) $R_2$: a hydrogen atom or an alkyl radical having from 1 to 4 carbon atoms; and (viii) R: alkyl radicals having from 1 to 4 carbon atoms or alkoxyalkyl radicals of the formula: $-R'''-O-R_3$, in which $R_3$ represents an alkyl radical having from 1 to 4 carbon atoms and in which R''' represents an alkylene radical having from 2 to 4 carbon atoms.

Also within the scope of the present invention, it is obviously envisaged to utilize a mixture of several compounds having aminopolyalkoxysilyl groups of the formula (I) and/or (II). Finally, the aminopolyalkoxypolysiloxane can contain one or more different units (II), these units optionally being combined with diorganosiloxy or polydiorganosiloxy units $-(Z_2SiO)_n-$, with n being a positive integer.

Preferably utilized consistent herewith is an aminopolyalkoxysilane of the formula (I) in which the various symbols represent, respectively:

(i) a: an integer equal to 1;
(ii) Z: a methyl, phenyl or vinyl radical, such radicals being optionally chlorinated or fluorinated;
(iii) X: a radical

(iv) $R_1$, $R'_1$, $R_2$: a hydrogen atom;
(v) R' and R": alkylene radicals having from 2 to 6 carbon atoms;
(vi) R''': an ethylene radical; and
(vii) R and $R_3$: methyl or ethyl radicals.

By way of illustration, those compounds having the following formulae are representative of the compounds comprising aminopolyalkoxysilyl groups:

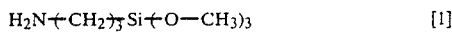 [1]

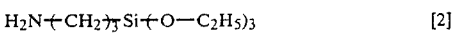 [2]

 [3]

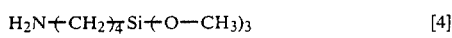 [4]

 [5]

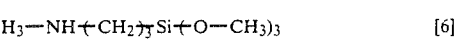 [6]

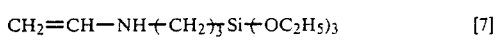 [7]

 [8]

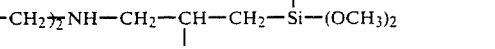 [9]

 [10]

 [11]

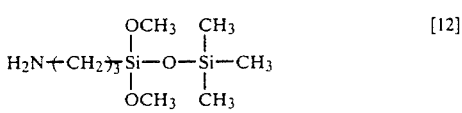 [12]

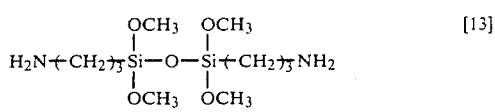 [13]

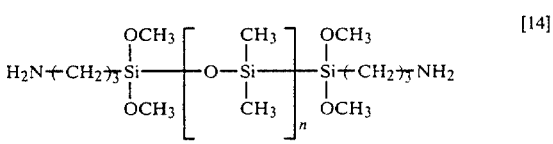 [14]

in which n is a positive integer.

The polysiloxane comprising hydroxysilyl groups and the compound comprising aminopolyalkoxysilyl groups, used to formulate the photocross-linkable organopolysiloxane composition, can be admixed in any proportions. These compounds are selected such as to ensure that, before hardening, the composition has a viscosity ranging from 20 to 20,000 mPa·s and preferably ranging from 50 to 3,000 mPa·s. To achieve this, the ratio of the number of hydroxyl groups bonded to a silicon atom to the number of alkoxy groups bonded to the silicon atoms is less than or equal to 1, preferably ranges from 0.1 to 1 and most preferably ranges from 0.1 to 0.9. Such compositions are storage stable in the absence of moisture and photocross-link rapidly and completely.

The organopolysiloxane compositions which can be photocross-linked by the process according to the invention can be obtained by simply admixing the polysiloxane comprising hydroxysilyl groups with the compound comprising aminopolyalkoxysilyl groups, either with or without a precondensation reaction having been carried out between the Si—OH and Si—(OR) groups before cross-linking; the precondensation reaction will obviously be carried out in the absence of moisture and by any known technique for the condensation of an organopolysiloxane comprising hydroxysilyl groups with a compound comprising polyalkoxysilyl groups.

It is therefore possible, within the scope of the present invention, to prepare and use simple mixtures or precondensates. Advantageously, precondensates are prepared and used since they display a better storage stability.

Thus, it is possible, if appropriate, to carry out simple cold mixing of the organopolysiloxane with the compound comprising aminopolyalkoxysilyl groups, without removing the volatile compounds resulting from the condensation reaction. The mixture can be heated to a temperature typically ranging from 20° to 160° C., such as to remove the volatile compounds formed; of course, this removal can be carried out under reduced pressure. It is also possible to prepare the precondensate by adding condensation catalysts or mixtures of condensation catalysts known for this purpose, such as alkyl titanates, titanium carboxylates, complexes and the like. The use of amino derivatives or organo-tin derivatives is envisaged, if appropriate, but titanium derivatives are the preferred catalysts.

And if catalysts are indeed employed, same are introduced such as to represent from 0.01 to 1% by weight of the overall mass of the compound comprising hydroxysilyl groups and the compound comprising aminopolyalkoxysilyl groups.

In another embodiment of the invention, it is appropriate to prepare a precondensate comprising a substantial excess of alkoxy groups, and then to add thereto an organopolysiloxane comprising hydroxysilyl groups, before use, such that the overall ratio of OH groups-/alkoxy groups corresponds to that immediately above-indicated.

The photocross-linking is itself carried out by exposing the compositions in the form of thin layers to ultraviolet radiation emitted by xenon lamps or mercury arc lamps, the emission spectrum of which ranges from 250 mm to 450 mm. The exposure time can vary. It can be between a fraction of a second and a few seconds and can be as much as about one hundred seconds. The process is typically carried out in the atmosphere or, if appropriate, in air having a relative humidity ranging from 20 to 80%. The process can also be carried out in a gaseous atmosphere constituted partially or in totality by oxygen and if appropriate in the presence of water vapor, the relative humidity being between 5% and 95% and preferably between 20 and 80%. Traces of oxygen are sufficient and it is further desirable to carry out the process in a gaseous atmosphere containing a relative humidity between 5 and 95%. The atmosphere preferred because of its minimal cost and the ease of its application is air having a relative humidity between 5 and 95%, preferably between 20 and 80%.

In a preferred embodiment of the invention, photosensitizers are introduced into the composition to be photocross-linked. Thus, it is possible to so employ any known compound possessing photosensitizing properties, such as derivatives of benzophenone, acetophenone, benzoin, xanthone and thioxanthone.

Examples of photosensitizers which are representative are: the propyl, isopropyl, butyl and isobutyl ethers of benzoin, 3-chloroxanthone, 3-methoxyxanthone, 2-chlorothioxanthone, acetophenone and benzophenone.

The amount of photosensitizer typically ranges from 0.01 to 20%, relative to the overall mass of the composition obtained from the polysiloxane comprising hydroxysilyl groups and the compound comprising aminopolyalkoxysilyl groups.

Such amount of photosensitizer preferably ranges from 0.1 to 5%.

In another embodiment of the invention, various compounds comprising polyalkoxysilyl groups and optionally bearing other functional groups can be used in combination with the compounds comprising the aminopolyalkoxysilyl groups. Monomeric or polymeric polyalkoxysilyl compounds or, alternatively, epoxypolyalkoxysilanes are representative of this particular embodiment.

The monomeric compounds comprising polyalkoxysilyl groups have the formula:

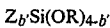

in which b' represents zero or an integer equal to 1 or 2, and in which the symbols Z and R are as defined above. By way of illustration, the compounds of the following formulae are representative of such compounds:

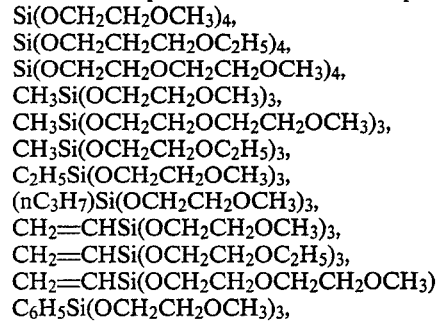

Preferably, the cross-linking agents of the following formulae are introduced, either alone or in mixtures thereof, into the photocross-linkable compositions according to the invention:

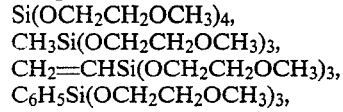

The compounds comprising polyalkoxysilyl groups can be disiloxane compounds or polymeric compounds (silicates, polysilicates, polyalkoxypolysiloxanes) resulting from the partial hydrolysis of monomers of the formula Si-(OR)$_4$ and/or ZSi(OR)$_3$.

Difunctional compounds such as Z$_2$Si(OR)$_2$ can obviously be used in combination with these various monomers during the hydrolysis; moreover, also within the scope of the present invention, it is possible to use a mixture of compounds comprising polyalkoxysilyl groups of the monomeric or polymeric type.

By way of illustration, the following are representative of the polyalkoxysilyl compounds of the polymeric type: methyl silicate, ethyl silicate, propyl silicate, isopropyl silicate, butyl silicate, β-methoxyethyl silicate, β-ethoxyethyl silicate, methyl ethyl silicates and methyl butyl silicates.

In another embodiment of the present invention, an epoxypolyalkoxysilane having one of the following general formulae:

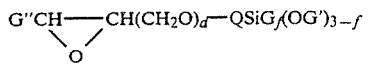

and

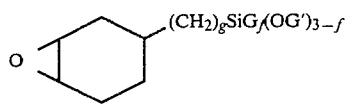

may be introduced at the same time as the compound comprising aminopolyalkoxysilyl groups; in these formulae, the symbol G represents an alkyl group having from 1 to 4 carbon atoms or the phenyl group, the symbol G' represents an alkyl group having from 1 to 3 carbon atoms or the methoxyethyl group, the symbol G" represents a hydrogen atom or an alkyl group having from 1 to 3 carbon atoms, the symbol Q represents an alkylene radical having from 1 to 10 carbon atoms, the symbol f represents 0 to 1, the symbol g represents 0 or 2 and the symbol d represents 0 or 1.

The following are exemplary of alkyl radicals having from 1 to 3 carbon atoms, represented by G' and G": methyl, ethyl, n-propyl and isopropyl radicals.

The following are exemplary of alkylene radicals having from 1 to 10 carbon atoms, represented by Q: the radicals of the formulae

—CH$_2$—,
—(CH$_2$)$_2$—,
—(CH$_2$)$_3$—,

—CH$_2$—CH—CH$_2$CH$_2$—,
　　　　|
　　　　CH$_3$

—(CH$_2$)$_5$—,
—(CH$_2$)$_8$—.

More specifically, these epoxysilanes can correspond to the formulae below, which illustrate how the different definitions of G, G', G", Q, d, f and g can be combined:

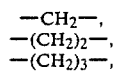

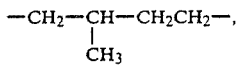

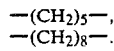

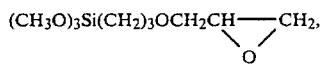

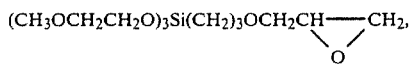

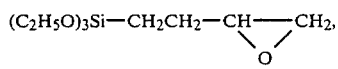

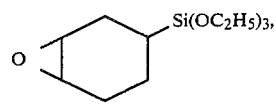

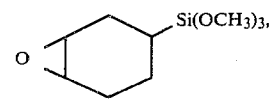

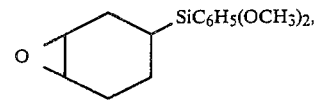

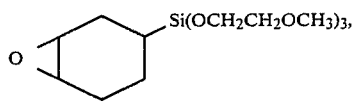

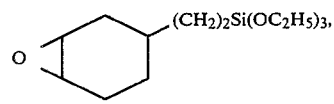

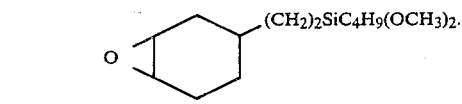

The methods of preparation and the characteristics of these epoxysilanes are described in the chemical literature, and more especially in French patent Nos. 1,185,009, 1,526,291 and 1,548,971.

Epoxysilanes having glycidoxypropyl groups bonded to the silicon atoms (these correspond, for example, to the first two structural formulae shown above) will preferably be selected, because same are available industrially or are easy to prepare.

The relative proportions of the compound comprising aminopolyalkoxysilyl groups and the compound comprising polyalkoxysilyl groups and/or the epoxysilane can vary very widely. Usually, the compound comprising aminopolyalkoxysilyl groups represents from 1 to 20% by weight and preferably from 1 to 5% by weight of the total weight of the composition.

The subject photocross-linkable compositions can be employed in numerous fields. They can be used to deposit non-stick coatings on various materials or substrates, such as metal materials, synthetic materials or cellulosic materials (kraft paper of any degree of beating, glassine, parchments, cardboard and the like). For this type of application, the radicals Z are exclusively methyl radicals, but it being possible for 3% thereof to be vinyl radicals. It is also possible to use the photo-cross-linkable compositions for obtaining a protective varnish for the electronics industry. In this particular field, the polysiloxanes simultaneously contain alkyl groups and aryl groups as the hydrocarbon groups bonded to the silicon atoms. In this context, exemplary are α,ω-dihydroxydiorganopolysiloxanes consisting of dimethylsiloxy, methylphenylsiloxy and, if appropriate, diphenylsiloxy units.

Finally, other ingredients not yet mentioned, such as inorganic or organic fillers, pigments, structuring inhibitors, heat stabilizers or UV stabilizers, thixotropic agents, corrosion inhibitors and the like, can also be incorporated into the photocross-linkable compositions according to the invention.

The inorganic fillers are typically pyrogenic silicas or precipitated silicas, the physicochemical characteristics of which depend on the use envisaged. If appropriate, the various silicas will have been subjected to a treatment for modification of their surface properties, in particular for making them hydrophobic; the nature of the various agents intended for modifying the surface properties is not critical. The agents used are generally of organosilicon type, such as silazanes (hexamethyldisilazane and the like), alkylsilanes (trimethylsilane and the like), alkylalkoxysilanes (trimethylethoxysilane and the like), alkylchlorosilanes, alkenylchlorosilanes, $\alpha,\omega$-dihydroxyorganopolysiloxanes, cyclosiloxanes and the like, and are described, for example, in French patent Nos. 2,356,596 and 2,395,952.

Moreover, in addition to the treated silica, the compositions can contain other fillers, such as quartz powder, diatomaceous earth, talc, carbon black and the like.

Among the organic fillers which can be used, exemplary are powdered cork, wood sawdust, synthetic fibers, asbestos fibers, cellulosic fibers and the like.

The overall amount of filler obviously depends upon the application envisaged. Thus, for the compositions used for the preparation of coatings, from 5 to 50% and preferably from 10 to 40% by weight of pyrogenic or precipitated silica is generally incorporated.

The process according to the invention is particularly advantageous from an industrial point of view: it makes it possible to very simply cross-link thin layers produced from the organopolysiloxane compositions such as defined above, simply by exposure to UV radiation.

In particular in the case of paper, excellent non-stick coatings are obtained on viscous sticky substances, pasty substances or substances which release or evolve moisture. The papers treated in this manner can be used as insets, removable backings for transfers and labels, and packaging for foodstuffs or sticky industrial products.

In order to further illustrate the present invention and the advantages thereof, the following specific examples are given, it being understood that same are intended only as illustrative and in nowise limitative.

EXAMPLE 1

The following materials were intimately admixed at ambient temperature, under stirring:

(i) 5 g of $\gamma$-aminopropyltrimethoxysilane; and (ii) 136.1 g of $\alpha,\omega$-dihydroxypolydimethylsiloxane oil (0.94% of OH - Brookfield viscosity at 20° C.: 110 mPa·s).

The ratio of the functional groups OH/OCH$_3$ was 0.9. The ingredients were maintained in contact for 6 hours at 20° C. in a closed flask, under stirring. The viscosity reached a value of 350 mPa·s.

To a portion of the resulting admixture, the following ingredients were added, depending upon the particular experiment:

(1) 0.2% of tetraisopropyl titanate (TIPT) at the beginning of the mixing, [(isopropyl-O)$_4$—Ti], (2) 4% of photoinitiator, Triganol ® 4 from UCB (mixture of benzoin ethers), before the photocross-linking experiment.

This formulation was applied by hand to kraft paper of Sibille grade 9530, the thickness of the deposits being about 2$\mu$. Same was subjected to irradiation from a Philips type HOK 6 mercury vapor lamp equipped with an elliptical mirror, at a distance of 5.6 cm, the sample being at the 2nd focus of the ellipse. The cross-linking was assessed by the absence of a greasy feel or "smear".

The non-stick property of the paper was then determined according to tests commonly used by those skilled in this art:

(a) Barnier 1100 adhesive tape test;
(b) Soluron A 1030 E adhesive transfer test.

The results obtained are tabulated below:

| Formulation | UV exposure time in seconds | Stripping force (g/cm) Barnier test | Soluron test |
|---|---|---|---|
| No TIPT - 4% of Trigonal 14 | 0.6 | 28 | |
| 0.2% of TIPT - no Trigonal 14 | 2 | 27.1 | |
| 0.2% of TIPT - 4% of Trigonal 14 | 0.4 | 19.4 | 2.5 |

EXAMPLE 2

The following materials were successively introduced into a 6 liter reactor equipped with a stirrer, a column head, a nitrogen bubbler and an oil bath:

(i) 3,300 g of polydimethylpolysiloxane oil having 0.72% of OH and a Brookfield viscosity at 20° C. of 120 mPa·s;

(ii) 92.8 g of $\gamma$-aminopropyltrimethoxysilane; and (iii) 6.78 g of tetraisopropyl titanate.

The ratio of the functional groups OH/OCH$_3$ was 0.9.

The mixture was heated from 20° to 120° C. over 50 minutes and then cooled.

7.21 g of volatiles were recovered, corresponding to 16% of the theoretical amount of methanol.

This provided a homogeneous condensate having a Brookfield viscosity at 20° C. of 310 mPa·s.

After the addition of 4% of Trigonal ® 14, 2 photocross-linking experiments were carried out on kraft paper of Sibille grade 9530:

(1) Deposition by hand to a thickness of 2 microns, and cross-linking as in Example 1.

The deposit was cross-linked after an exposure time of 0.6 second.

(2) Deposition on a coating machine equipped with a head of the helio-sliding type, at a speed of 10 m/minute, followed by passage under 3 Philips HOK6 lamps equipped with parabolic mirrors.

Rate of deposition: 0.7 g/m$^2$

Exposure time in the field of the UV radiation: 1.5 seconds

The deposit was completely cross-linked, as evidenced by the absence of "smear".

Non-stick property:

(a) Barnier 1100 test: 30 g/cm;
(b) Soluron test: 1.5 g/cm.

EXAMPLE 3

The following materials were introduced into a 1 liter (i) 800 g of polydimethylpolysiloxane oil having 0.72% of OH and a Brookfield viscosity at 20° C. of 120 mPa·s;

(ii) 28.9 g of $\gamma$-aminopropyltrimethoxysilane; and (iii) 1.65 g of tetraisopropyl titanate.

The ratio OH/OCH$_3$ was 0.7.

The mixture was heated from 20° to 118° C. over 35 minutes in an oil bath and then cooled.

3.55 g of volatiles were recovered, corresponding to 32.5% of the theoretical amount of methanol.

Brookfield viscosity at 20° C. of the condensate: 580 mPa·s.

When examined as in Example 1, after the addition of photoinitiator, this condensate was cross-linked in 0.4 second.

EXAMPLE 4

The following materials were introduced into a 1 liter reactor:
(i) 800 g of polydimethylpolysiloxane oil having 0.72% of OH and a Brookfield viscosity at 20° C. of 120 mPa·s;
(ii) 20.25 g of γ-aminopropyltrimethoxysilane; and
(iii) 1.64 g of tetraisopropyl titanate.

The ratio of the functional groups $OH/OCH_3$ was 1.

The mixture was heated from 20° to 120° C. over 45 minutes in an oil bath and then cooled.

1.06 g of volatiles were recovered, corresponding to 10% of the theoretical amount of methanol.

Brookfield viscosity at 20° C.: 320 mPa·s.

When examined as in Example 1, this condensate was cross-linked in 2 seconds without photoinitiator and in 0.4 second after the addition of 4% of Trigonal 14.

Non-stick property:
(a) Barnier 1100 test: 22.8 g/cm;
(b) Soluron test: 1.2 g/cm.

EXAMPLE 5

The following materials were introduced into a 1 liter rotary evaporator operating under a partial vacuum:
(i) 400 g of polydimethylpolysiloxane oil having 0.72% of OH and a Brookfield viscosity at 20° C. of 120 mPa·s;
(ii) 10.12 g of γ-aminopropyltrimethoxysilane; and
(iii) 0.82 g of tetraisopropyl titanate.

The ratio of functional groups $OH/OCH_3$ was 1.

A pressure of 25 millibars was applied and the mixture was heated for 2 hours at 30° C. and then for 40 minutes from 30° to 50° C.

Methanol recovered: 3.12 g, corresponding to 57.5% of theory.

Brookfield viscosity at 20° C. of the condensate: 220 mPa·s.

When examined as in Example 1, in the presence of photoinitiator, this condensate was cross-linked in 0.4 second.

EXAMPLE 6

The following materials were introduced into a 1 liter rotary evaporator:
(i) 400 g of polydimethylpolysiloxane oil having 0.72% of OH and a Brookfield viscosity at 20° C. of 120 mPa·s;
(ii) 16.87 g of γ-aminopropyltrimethoxysilane; and
(iii) 0.83 g of tetraisopropyl titanate.

The ratio of functional groups $OH/OCH_3$ was 0.6.

A pressure of 25 millibars was applied and the mixture was permitted to react for 30 minutes at 20° C. and heated for 30 minutes from 20° to 50° C.

4.93 g of volatiles were recovered, corresponding to 77.3% of the theoretical amount of methanol, according to determination by GC.

Brookfield viscosity at 20° C.: 1,160 mPa·s.

When examined as in Example 1, in the presence of photoinitiator, this condensate was photocross-linked in 0.4 second.

EXAMPLE 7

The following materials were introduced into a 1 liter rotary evaporator:
(i) 600 g of polydimethylpolysiloxane oil having 0.72% of OH and a Brookfield viscosity at 30° C. of 120 mPa·s;
(ii) 45.53 g of γ-aminopropyltrimethoxysilane; and
(iii) 1.29 g of tetraisopropyl titanate.

The ratio of functional groups $OH/OCH_3$ was 0.33.

A pressure of 25 millibars was applied and the mixture was heated for 1 hour from 20° to 30° C. and then for 30 minutes from 30° to 50° C.

10.2 g of volatiles were recovered, corresponding to 100% of the theoretical amount of methanol, according to determination by GC.

Brookfield viscosity at 20° C. of the condensate: 150 mPa·s.

While being protected from moisture and light, the viscosity was 300 mPa·s after 3 months.

Analysis of this product by NMR evidenced the following distribution for the silicon atoms at the ends of the polymer chains:

(1) 38% having the configuration:

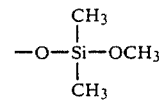

(2) 31% having the configuration:

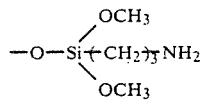

(3) 31% having the configuration:

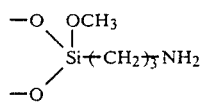

In another reactor, 100 g of this condensate were admixed with:
(iv) 170 g of the same polydimethylpolysiloxane oil as above; and
(v) 0.34 g of tetraisopropyl titanate.

The ratio of functional groups $OH/OCH_3$ was 0.9.

The ingredients were mentioned in contact for 5 hours 30 minutes at 20° C.

The Brookfield viscosity at 20° C. attained 400 mPa·s.

For these two condensates, in the presence of photoinitiator, the cross-linking was effected in 0.4 second.

EXAMPLE 8

The following materials were introduced into a 1 liter rotary evaporator:
(i) 105 g of dihydroxydimethyldiphenylpolysiloxane oil having 2.56% of OH and a Brookfield viscosity at 20° C. of 97 mPa·s;
(ii) 28.34 g of γ-aminopropyltrimethoxysilane; and
(iii) 0.266 g of tetraisopropyl titanate.

The ratio of the functional groups OH/OCH$_3$ was 0.33.

The mixture was treated for 2 hours 30 minutes at 20° C. under 25 millibars and 4.53 g of volatiles were recovered, corresponding to 80% of the theoretical amount of methanol.

Brookfield viscosity at 20° C. of the condensate: 120 mPa·s.

After 3 months, the viscosity attained 200 mPa·s.

When examined as in Example 1, but on an aluminum plate, this condensate was photocross-linked in 1.4 seconds (with photoinitiator).

The coating cross-linked in this manner displayed good adhesion, good resistance to solvents and to cold conditions, good electrical properties, low thermoplasticity and high flexibility.

Same was well adapted to protect various metals and could be employed in numerous fields of application, more particularly in electronics.

EXAMPLE 9

The following materials were introduced into a rotary evaporator:

(i) 150 g of polydimethylpolysiloxane oil having 0.72% of OH and a Brookfield viscosity at 20° C. of 120 mPa·s;

(ii) 10.37 g of γ-aminopropylmethyldimethoxysilane; and (iii) 0.32 g of tetraisopropyl titanate.

The ratio of functional groups OH/OCH$_3$ was 0.5.

A pressure of 25 millibars was applied. The mixture was permitted to react for 40 minutes at 20° C. and then heated for 10 minutes from 20° to 50° C.

Methanol recovered: 82.7% of theory (according to determination by GC).

Brookfield viscosity at 20° C. of the condensate: 130 mPa·s;

230 mPa·s after storage for 3 months while protected from moisture and light.

When examined as in Example 1, this condensate cross-linked in 1.2 seconds (with photoinitiator).

EXAMPLE 10

The following material was introduced into a 250 cm three-necked round-bottomed flask equipped with a central stirrer and a dropping funnel and connected to a receiver flask immersed in dry ice and also to a source of vacuum:

(i) 52.2 g of γ-aminopropyltrimethoxysilane.

The following material was run slowly therein, over a period of 40 minutes, into the flask heated to between 60° and 70° C.:

(ii) 62.5 g of polydimethylpolysiloxane oil having 3.95% of OH and a Brookfield viscosity at 30° C. of 65 mPa·s, the methanol formed being progressively distilled under a reduced pressure of 20 millibars.

The excess γ-aminopropyltrimethoxysilane was then removed by heating to about 70° C. under a pressure of 1 millibar.

This provided a light yellow product having a viscosity of 800 mPa·s, which was stable when protected from moisture and at a moderate temperature.

Analysis of this product by determination of the amine groups and by NMR evidenced that the structure was as follows:

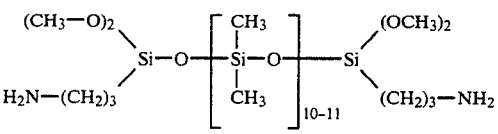

When applied as a thin layer (2μ) to a glass plate, this product was photocross-linked in 1.6 seconds without photoinitiator and in 0.4 second with 4% of Trigonal 14.

EXAMPLE 11

The following materials were introduced into a rotary evaporator:

(i) 400 g of polydimethylpolysiloxane oil having 0.72% of OH and a Brookfield viscosity of 130 mPa·s;

(ii) 37.66 g of N-aminoethyl-γ-aminopropyltrimethoxysilane; and (iii) 0.87 g of tetraisopropyl titanate.

The ratio of functional groups OH/OCH$_3$ was 0.33.

A pressure of 25 millibars was applied. The mixture was permitted to react for 30 minutes at 20° C. and then heated for 30 minutes from 20° to 50° C. 5.1 g of volatiles were recovered, corresponding to 80% of the theoretical amount of methanol.

Brookfield viscosity at 20° C.: 350 mPa·s;

940 mPa·s after storage for 14 days protected from moisture and light.

The following materials were introduced into a stirred reactor:

(iv) 10 g of the above condensate;

(v) 16.52 g of the same silicon oil as above; and (vi) 0.033 g of tetraisopropyl titanate.

The final ratio of the functional groups OH/OCH$_3$ was 0.9.

The mixture was maintained for 4 hours at 20° C. The viscosity attained 420 mPa·s.

When examined as in Example 1, in the presence of photoinitiator, these two condensates were cross-linked in 0.6 second, resulting in good non-stick properties.

EXAMPLE 12

The following materials were introduced into a 1 liter rotary evaporator:

(i) 40.02 g of γ-glycidoxypropyltrimethoxysilane; and (ii) 30.37 g of γ-aminopropyltrimethoxysilane.

The mixture was permitted to react for 10 minutes and the following materials were then added thereto:

(iii) 400 g of silicone oil having 0.72% of OH and a Brookfield viscosity at 20° C. of 120 mPa·s; and (iv) 0.94 g of tetraisopropyl titanate.

The ratio of functional groups OH/OCH$_3$ was 0.166.

A pressure of 25 millibars was applied. The mixture was maintained for 30 minutes at 20° C. and then heated for 30 minutes from 20° to 50° C.

6.17 g of volatiles were recovered, corresponding to 100% of the theoretical amount of methanol.

Brookfield viscosity at 20° C.: 140 mPa·s.

When examined as in Example 1, this condensate cross-linked in 0.6 second.

EXAMPLE 13

The following materials were introduced into a 1 liter rotary evaporator:

(i) 400 g of silicone oil having 0.72% of OH and a Brookfield viscosity at 20° C. of 120 mPa·s;

(ii) 37.49 g of γ-aminopropyltriethoxysilane; and (iii) 0.87 g of tetraisopropyl titanate.

The ratio of functional groups $OH/OC_2H_5$ was 0.33.

A pressure of 25 millibars was applied. The mixture was permitted to react for 30 minutes at 20° C. and then heated for 30 minutes from 20° to 50° C. and for 30 minutes from 50° to 80° C. and maintained for 30 minutes at 80° C.

7.14 g of volatiles were recovered, corresponding to 70.5% of the theoretical amount of methanol.

Brookfield viscosity at 20° C.: 210 mPa·s; 510 mPa·s after storage for 100 hours protected from moisture and light.

The following materials were introduced into another evaporator:

(i) 50 g of the above condensate;
(ii) 83.33 g of the same silicone oil as above;
(iii) 0.167 g of tetraisopropyl titanate.

The final ratio of the functional groups $OH/OC_2H_5$ was 0.9.

Under a pressure of 25 millibars, the mixture was permitted to react for 30 minutes at 20° C. and then heated for 30 minutes from 20° to 80° C.

1.05 g of volatiles were recovered.

Brookfield viscosity at 20° C.: 340 mPa·s.

When examined as in Example 1, the 1st and 2nd condensates were cross-linked in 2.4 and 3.2 seconds, respectively, without photoinitiator and were both cross-linked in 0.8 second in the presence of 4% of Trigonal 14.

Good non-stick properties were determined in all cases.

EXAMPLE 14

The following materials were introduced into a 500 ml rotary evaporator:

(i) 200 g of polydimethylpolysiloxane oil having 4.53% of OH and a Brookfield viscosity at 20° C. of 60 mPa·s;
(ii) 95.55 g of γ-aminopropyltrimethoxysilane; and
(iii) 0.59 g of tetraisopropyl titanate.

The ratio of the functional groups $OH/OCH_3$ was 0.33.

A pressure of 25 millibars was applied and the mixture was permitted to react for 15 minutes at 20° C. and then heated for 30 minutes from 20° to 50° C.

16.70 g of volatiles were recovered, corresponding to 93.9% of the theoretical amount of methanol, according to determination by GC.

Brookfield viscosity at 20° C.: 34 mPa·s.

The following materials were introduced into a stirred reactor:

(iv) 25 g of the above condensate;
(v) 201.4 g of polydimethylpolysiloxane oil having 0.72% of OH and a Brookfield viscosity at 20° C. of 120 mPa·s; and (vi) 0.40 g of tetraisopropyl titanate.

The final ratio of the functional groups $OH/OCH_3$ was 0.9.

The mixture was maintained for 18 hours at 20° C. The viscosity attained 340 mPa·s.

The following materials were introduced into another stirred reactor:

(vii) 10 g of the same condensate;
(viii) 290.5 g of polydimethylpolysiloxane oil having 0.2% of OH and a Brookfield viscosity at 20° C. of 1,020 mPa·s; and
(ix) 0.58 g of tetraisopropyl titanate.

The final ratio of functional groups $OH/OCH_3$ was 0.9.

The mixture was permitted to react for 18 hours. The viscosity attained 3,500 mPa·s.

When examined as in Example 1, in the presence of photoinitiator, the three condensates were cross-linked in 1 second with stripping forces in the Barnier tape test of 75.5, 29.2 and 30.2 g/cm, respectively.

COMPARATIVE EXAMPLE

An oil is prepared according to the mode of operation of Example 10 and a product is obtained with the formula given in Example 10.

This oil is applied manually to kraft paper, Grade 9530 of Sibille, the thickness of the deposit being approximately 10μ. The assembly is exposed to the radiation of an UV lamp, Type SP 500 W, of Philips, cooled by the circulation of distilled water, at a distance of 7 cm. The assembly is placed in a gas tight enclosure and equipped with a cover comprising a sheet of quartz. A thermocouple, placed on the sample, shows that the heating does not exceed 40° C. These experimental conditions lead to cross-linking times longer than those with the apparatus used in the preceding Examples 1 to 14. Results are compiled in the table hereinbelow. Columns $t_1$ and $t_2$ indicate the time required to obtain the non-tacky touch respectively without UV treatment and with the UV treatment.

Experiments 1 and 2 conform to the invention. Experiments 3 to 6 do not, as during the UV treatment, the atmosphere surrounding the sample to be treated is free of oxygen, even in the form of traces.

Furthermore, Experiment 2 shows that it is desirable to use UV of shorter wave lengths, as with the sheet of glass being interposed between the lamp and the sample. The glass eliminates rays with a wave length of less than 3000 Å and very strongly absorbs rays between 3000 and 3500 Å.

The UV radiation is thus between 3500 and 4500 Å. To obtain short cross-linking times, it is therefore desirable to operate with a UV lamp, the radiation of which includes a zone of wave lengths between 2500 and 3000 Å.

| Experiment No. | Atmosphere of the gas tight enclosure | $t_1$ without UV (time in min.) | $t_2$ with UV (time in min.) | Comments |
| --- | --- | --- | --- | --- |
| 1 | humid air | 6 to 7 min. | 1 min, 50 sec. 1 min, 30 sec. | |
| 2 | humid air | 6 to 7 min. | 4 min, 30 sec. | The sheet of glass eliminates the "short" UV which increases the cross linking times |
| 3 | dry nitrogen | 85 min. | 85 min with 25 min under | In the absence of oxygen and humidity, |

-continued

| Experiment No. | Atmosphere of the gas tight enclosure | $t_1$ without UV (time in min.) | $t_2$ with UV (time in min.) | Comments |
|---|---|---|---|---|
| 4 | dry argon | 125 min. | UV 110 min with 28 min under UV | UV does not accelerate cross linking |
| 5 | humid nitrogen (saturation at 20° C.) | 5 min. | 4 min. 30 sec. | Presence of water but absence of oxygen - Rather rapid cross-linking but UV does not contribute |
| 6 | humid argon (saturation at 20° C.). | 4 min. | 4 min. | |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the photocuring of an organopolysiloxane composition, comprising subjecting to a photo-cross-linking amount of ultravoilet radiation, admixture of (i) a polysiloxane comprised of hydroxysilyl groups devoid of Si-H bonds and containing no organic radicals which include sites of activated ethylenic unsaturation, and (ii) an aminopolyalkoxysilane, with said admixture being in the form of a thin layer thereof, in a gaseous atmosphere comprised of at least traces of oxygen.

2. The process as defined by claim 1, said gaseous atmosphere having a relative humidity of between 5 and 95%.

3. The process as defined by claim 2, said gaseous atmosphere comprising air.

4. The process as defined by claim 1, the polysiloxane (i) comprising an α,ω-dihydroxypolydiorganopolysiloxane which comprises units of the formula $(Z_2SiO)$, wherein each Z, which may be the same or different, is a saturated aliphatic or cycloaliphatic hydrocarbon radical having from 1 to 6 carbon atoms, or a substituted such radical bearing from 1 to 6 chlorine and/or fluorine atom substituents; an alkenyl radical having from 2 to 4 carbon atoms and representing at most 5% by number of the total number of hydrocarbon radicals comprising said organopolysiloxane (i); or a phenyl, alkylphenyl or phenylalkyl radical having from 6 to 8 carbon atoms, or a substituted such radical bearing from 1 to 4 chlorine and/or fluorine atom substituents.

5. The process as defined by claim 4, each Z being methyl; ethyl; propyl; isopropyl; butyl; isobutyl; α-pentyl, t-butyl; chloromethyl; dichloromethyl; α-chloroethyl; α,β-dichloroethyl; fluoromethyl; difluoromethyl; α,β-difluoroethyl; 3,3,3-trifluoropropyl; trifluorocyclopropyl; 4,4,4-trifluorobutyl; 3,3,3,4,4,5,5-heptafluoropentyl; vinyl; allyl; phenyl; p-chlorophenyl; m-chlorophenyl; 3,5-dichlorophenyl; trichlorophenyl; tetrachlorophenyl; o-, p- or m-tolyl; α,α,α-trifluorotyl; xylyl; 2,3-dimethylphenyl; or 3,4-dimethylphenyl.

6. The process as defined by claim 4, the polysiloxane (i) comprising admixture of said α,ω-dihydroxypolydiorganopolysiloxane together with an organopolysiloxane resin which comprises units of the formulae $ZSiO_3$, $SiO_2$, $(Z_2SiO)$ and $(Z)_2(OH)SiO_{0.5}$ in any proportions thereof.

7. The process as defined by claim 4, each Z being methyl, phenyl or vinyl, or a chlorinated and/or fluorinated such radical.

8. The process as defined by claim 4, the aminopolyalkoxysilane (ii) having the formula:

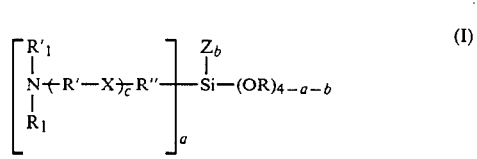

or being comprised of recurring units of the formula:

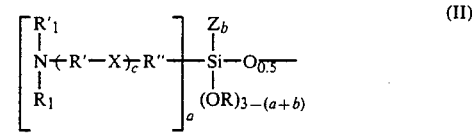

or being comprised of the recurring units (II) and units of the formula $(Z_2SiO)_{\overline{m}}$, wherein a is an integer of from 1 to 2; b is an integer of from 0 to 1, with the sum (a+b) being no greater than 2; c is an integer of from 0 to 1; X is oxygen or $-NR_2-$; $R_1$ and $R'_1$, identical or different, are hydrogen or an alkyl radical having from 1 to 4 carbon atoms; $R'$ and $R''$ are each alkylene radicals having from 1 to 6 carbon atoms; $R_2$ is hydrogen or an alkyl radical having from 1 to 4 carbon atoms; and R is an alkyl radical having from 1 to 4 carbon atoms or an alkoxyalkyl radical of the formula $-R'''-O-R_3$, in which $R_3$ is an alkyl radical having from 1 to 4 carbon atoms and $R'''$ is an alkylene radical having from 2 to 4 carbon atoms.

9. The process as defined by claim 8, the aminopolyalkoxysilane (ii) having the formula (I), in which a is 1; Z is methyl, phenyl or vinyl, or a chlorinated and/or fluorinated such radical; X is $-NR_2-$; $R_1$, $R'_1$ and $R_2$ are hydrogen; $R'$ and $R''$ are alkylene radicals having from 2 to 6 carbon atoms; $R'''$ is ethylene; and R and $R_3$ are methyl or ethyl radicals.

10. The process as defined by claim 1, wherein said admixture the ratio of the number of hydroxyl groups bonded to a silicon atom to the number of alkoxy groups bonded to silicon atoms ranges from 0.1 to 1.

11. The process as defined by claim 1, said admixture comprising a precondensate of the polysiloxane (i) and aminopolyalkoxysilane (ii).

12. The process as defined by claim 1 said photocrosslinking being carried out in air having a relative humidity ranging from 20 to 80%.

13. The process as defined by claim 1, said admixture further comprising a photoinitiating amount of a photosensitizer.

14. The process as defined by claim 1, said photosensitizer comprising a benzophenone, acetophenone, benzoin, xanthone or thioxanthone.

15. The process as defined by claim 1, said admixture further comprising a monomeric or polymeric polyalkoxysilyl compound.

16. The process as defined by claim 1, said admixture further comprising an epoxypolyalkoxysilane.

17. The product of the process as defined by claim 1.

18. A substrate coated with a non-stick coating of the photocured product of the process as defined by claim 1.

* * * * *